US012731380B2

(12) United States Patent
Sridhar et al.

(10) Patent No.: US 12,731,380 B2
(45) Date of Patent: Sep. 8, 2026

(54) COMPUTER-IMPLEMENTED METHODS, COMPUTING SYSTEMS, AND NON-TRANSITORY MACHINE-READABLE MEDIUMS FOR VISION TRANSFORMING

(71) Applicants: Deepak Sridhar, San Diego, CA (US); Jizong Peng, Markham (CA); Md Ibrahim Khalil, Markham (CA); Peng Dai, Markham (CA); Juwei Lu, Markham (CA); Renjing Pei, Shenzhen (CN); Songcen Xu, Shenzhen (CN)

(72) Inventors: Deepak Sridhar, San Diego, CA (US); Jizong Peng, Markham (CA); Md Ibrahim Khalil, Markham (CA); Peng Dai, Markham (CA); Juwei Lu, Markham (CA); Renjing Pei, Shenzhen (CN); Songcen Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/417,929

(22) Filed: Jan. 19, 2024

(65) Prior Publication Data

US 2025/0239053 A1 Jul. 24, 2025

(51) Int. Cl.
*G06V 10/77* (2022.01)
*G06V 10/82* (2022.01)

(52) U.S. Cl.
CPC .......... *G06V 10/7715* (2022.01); *G06V 10/82* (2022.01)

(58) Field of Classification Search
None
See application file for complete search history.

(56) References Cited

U.S. PATENT DOCUMENTS

2023/0135109 A1* 5/2023 Wu .................... G06F 18/2163 706/12
2023/0298321 A1* 9/2023 Bulat .................... G06V 20/41 382/173
2024/0193404 A1* 6/2024 Maaz .................. G06V 10/764

OTHER PUBLICATIONS

Dosovitskiy, Alexey, et al., "An Image Is Worth 16×16 Words: Transformers for Image Recognition at Scale", arXiv:2010.11929v2 [cs.CV], pp. 1-22, Jun. 3, 2021.
Wang, Wenhai, et al., "Pyramid Vision Transformer: A Versatile Backbone for Dense Prediction without Convolutions", arXiv:2102.12122v2 [cs.CV], pp. 1-15, Aug. 11, 2021.
Guo, Jianyuan, et al., "CMT: Convolutional Neural Networks Meet Vision Transformers", arXiv:2107.06263v3 [cs.CV], pp. 1-11, Jun. 14, 2022.

(Continued)

*Primary Examiner* — Darryl V Dottin

(57) ABSTRACT

A computer-implemented method for vision transforming includes, for each of one or more channels of each of a set of tiles of an image: splitting the channel into at least a first channel portion and a second channel portion; processing the first channel portion using depthwise convolution; processing the second channel portion with multi-head self-attention; and combining the processed first channel portion and the processed second channel portion; and identifying an object in the image at least partially based on the combined processed first channel portion and processed second channel portion for each of the one or more channels of each of the set of tiles of the image.

20 Claims, 10 Drawing Sheets

(56) References Cited

OTHER PUBLICATIONS

Chen, Yinpeng, "Mobile-Former: Bridging MobileNet and Transformer", arXiv:2108.05895v3 [cs.CV], pp. 1-15, Mar. 3, 2022.
Yu, Weihao, et al., "MetaFormer is Actual What You Need for Vision", arXiv:v [cs.CV], pp. 1-17, Jul. 4, 2022.
Pan, Xuran, et al., "On the Integration of Self-Attention and Convolution", pp. 1-16.
Si, Chenyang, et al., "Inception Transformer", arXiv:2205.12956v2 [cs.CV], pp. 1-17, May 26, 2022.
Li, Yanyu, et al., "EfficientFormer: Vision Transformers at MobileNet Speed", arXiv:2206.01191v5 [cs.CV], pp. 1-2, Oct. 11, 2022.

* cited by examiner

COMPUTER-IMPLEMENTED METHODS, COMPUTING SYSTEMS, AND NON-TRANSITORY MACHINE-READABLE MEDIUMS FOR VISION TRANSFORMING

TECHNICAL FIELD

The present disclosure relates to data structures, and, in particular, to computer-implemented methods, computing systems, and non-transitory machine-readable mediums for vision transforming.

BACKGROUND

Vision transformers have recently become popular and reached appealing performance on various computer vision tasks. However, compared to current widely-used convolutional neural networks, vision transformers usually require high computational costs (on both training and inference stages, leading to significantly longer latency and often high memory occupation). This prevent them of being deployed for practical applications, especially on edge/mobile devices and/or laptops.

The high computation nature of vision transformers largely comes from multi-head self-attention (MHSA), such as disclosed by "An image is worth 16×16 words: Transformers for image recognition at scale", A. Dosovitskiy et al., arXiv:2010.11929, 2020, or by "Efficient transformers: A survey", Y. Tay et al., ACM Computing Surveys (CSUR), 2020. In vision transformers, as illustrated in FIG. 1, image pixels are considered as a sequence of N tokens and MHSA computes a large N×N attention matrix which quantifies the pairwise relationship among tokens. The computational complexity of MHSA is thus quadratic to the input token size and is computationally very expensive when being applied to high resolution images. To reduce the complexity of MHSA, various approaches have been proposed to reduce the token size, such as disclosed by "Pyramid vision transformer: A versatile backbone for dense prediction without convolutions", W. Wang et al., Proceedings of the IEEE/CVF International Conference on Computer Vision. 2021, 568-578. Others have resorted to a hybrid architecture design that combines computationally-efficient convolution and attention in a sequential or parallel manner. See, for example, "Cmt: Convolutional neural networks meet vision transformers", J. Guo et al., Proceedings of the IEEE/CVF Conference on Computer Vision and Pattern Recognition, 2022, p. 12175-12185, or "On the integration of self-attention and convolution", X. Pan et al., Proceedings of the IEEE/CVF Conference on Computer Vision and Pattern Recognition, 2022, p. 815-825.

SUMMARY

In accordance with a first aspect of the present disclosure, there is provided a computer-implemented method for vision transforming, comprising: for each of one or more channels of each of a set of tiles of an image: splitting the channel into at least a first channel portion and a second channel portion; processing the first channel portion using depthwise convolution; processing the second channel portion with multi-head self-attention; and combining the processed first channel portion and the processed second channel portion; and identifying an object in the image at least partially based on the combined processed first channel portion and processed second channel portion for each of the one or more channels of each of the set of tiles of the image.

In some or all exemplary embodiments of the first aspect, the processing of the second channel portion includes reducing a size of tokens of the second channel portion.

In some or all exemplary embodiments of the first aspect, the combining includes processing the processed first channel portion and the processed second channel portion with a multilayer perceptron.

In some or all exemplary embodiments of the first aspect, during the splitting, the first channel portion is positioned within a window at a first position in the channel and the second channel portion is outside of the window at the first position, and the method further includes: for each of the one or more channels of each of the set of tiles of the image: shifting the window to a second position within the channel to identify a third channel portion positioned within the window at the second position and a fourth channel portion outside of the window at the second position; processing the third channel portion using depthwise convolution; and processing the fourth channel portion with multi-head self-attention, wherein the combining includes combining the processed first channel portion, the processed second channel portion, the processed third channel portion, and the processed fourth channel portion.

In some or all exemplary embodiments of the first aspect, the window is one-half of the size of the channel, and wherein, during the shifting, the window is shifted one-half of the size of the channel.

In some or all exemplary embodiments of the first aspect, the method further includes, for each of the one or more channels of each of the set of tiles of the image: shifting the window to a third position within the channel to identify a fifth channel portion positioned within the window at the third position and a sixth channel portion outside of the window at the third position; processing the third channel portion using depthwise convolution; and processing the fourth channel portion with multi-head self-attention, wherein the combining includes combining the processed first channel portion, the processed second channel portion, the processed third channel portion, the processed fourth channel portion, the processed fifth channel portion, and the processed sixth channel portion.

In some or all exemplary embodiments of the first aspect, the splitting, the processing of the first channel portion, the processing of the second channel portion, and the combining are performed for each of the one or more channels of each of the set of tiles of two or more resolutions of the image.

In a second aspect of the present disclosure, there is provided a computing system for vision transforming, comprising: one or more processors; memory storing computer-executable instructions that, when executed by the one or more processors, cause the computing system to: for each of one or more channels of each of a set of tiles of an image: split the channel into at least a first channel portion and a second channel portion; process the first channel portion using depthwise convolution; process the second channel portion with multi-head self-attention; and combine the processed first channel portion and the processed second channel portion; and identify an object in the image at least partially based on the combined processed first channel portion and processed second channel portion for each of the one or more channels of each of the set of tiles of the image.

In some or all exemplary embodiments of the second aspect, the computer-executable instructions, when executed by the one or more processors, cause the computing system to, during the processing of the second channel portion, reduce a size of tokens of the second channel portion.

In some or all exemplary embodiments of the second aspect, the computer-executable instructions, when executed by the one or more processors, cause the computing system to, during the combining, process the processed first channel portion and the processed second channel portion with a multilayer perceptron.

In some or all exemplary embodiments of the second aspect, during the splitting, the first channel portion is positioned within a window at a first position in the channel and the second channel portion is outside of the window at the first position, and wherein the computer-executable instructions, when executed by the one or more processors, cause the computing system to: for each of the one or more channels of each of the set of tiles of the image: shift the window to a second position within the channel to identify a third channel portion positioned within the window at the second position and a fourth channel portion outside of the window at the second position; process the third channel portion using depthwise convolution; and process the fourth channel portion with multi-head self-attention, wherein the processed first channel portion, the processed second channel portion, the processed third channel portion, and the processed fourth channel portion are combined for each of the one or more channels of each of the set of tiles of the image.

In some or all exemplary embodiments of the second aspect, the window is one-half of the size of the channel, and wherein, during the shifting, the window is shifted one-half of the size of the channel.

In some or all exemplary embodiments of the second aspect, the computer-executable instructions, when executed by the one or more processors, cause the computing system to: for each of the one or more channels of each of the set of tiles of the image: shift the window to a third position within the channel to identify a fifth channel portion positioned within the window at the third position and a sixth channel portion outside of the window at the third position; processing the third channel portion using depthwise convolution; and processing the fourth channel portion with multi-head self-attention, wherein the combining includes combining the processed first channel portion, the processed second channel portion, the processed third channel portion, the processed fourth channel portion, the processed fifth channel portion, and the processed sixth channel portion.

In some or all exemplary embodiments of the second aspect, the computer-executable instructions, when executed by the one or more processors, cause the computing system to perform the splitting, the processing of the first channel portion, the processing of the second channel portion, and the combining are performed for each of the one or more channels of each of the set of tiles of two or more resolutions of the image.

In a third aspect of the present disclosure, there is provided a non-transitory machine-readable medium having tangibly stored thereon executable instructions for execution by one or more processors of a computing system, wherein the executable instructions, in response to execution by the one or more processors, cause the computing system to: for each of one or more channels of each of a set of tiles of an image: split the channel into at least a first channel portion and a second channel portion; process the first channel portion using depthwise convolution; process the second channel portion with multi-head self-attention; and combine the processed first channel portion and the processed second channel portion; and identify an object in the image at least partially based on the combined processed first channel portion and processed second channel portion for each of the one or more channels of each of the set of tiles of the image.

In some or all exemplary embodiments of the third aspect, the computer-executable instructions, when executed by the one or more processors, cause the computing system to, during the processing of the second channel portion, reduce a size of tokens of the second channel portion.

In some or all exemplary embodiments of the third aspect, the computer-executable instructions, when executed by the one or more processors, cause the computing system to, during the combining, process the processed first channel portion and the processed second channel portion with a multilayer perceptron.

In some or all exemplary embodiments of the third aspect, during the splitting, the first channel portion is positioned within a window at a first position in the channel and the second channel portion is outside of the window at the first position, and wherein the computer-executable instructions, when executed by the one or more processors, cause the computing system to: for each of the one or more channels of each of the set of tiles of the image: shift the window to a second position within the channel to identify a third channel portion positioned within the window at the second position and a fourth channel portion outside of the window at the second position; process the third channel portion using depthwise convolution; and process the fourth channel portion with multi-head self-attention, wherein the processed first channel portion, the processed second channel portion, the processed third channel portion, and the processed fourth channel portion are combined for each of the one or more channels of each of the set of tiles of the image.

In some or all exemplary embodiments of the third aspect, the window is one-half of the size of the channel, and wherein, during the shifting, the window is shifted one-half of the size of the channel.

In some or all exemplary embodiments of the third aspect, the computer-executable instructions, when executed by the one or more processors, cause the computing system to: for each of the one or more channels of each of the set of tiles of the image: shift the window to a third position within the channel to identify a fifth channel portion positioned within the window at the third position and a sixth channel portion outside of the window at the third position; processing the third channel portion using depthwise convolution; and processing the fourth channel portion with multi-head self-attention, wherein the combining includes combining the processed first channel portion, the processed second channel portion, the processed third channel portion, the processed fourth channel portion, the processed fifth channel portion, and the processed sixth channel portion.

In some or all exemplary embodiments of the third aspect, the computer-executable instructions, when executed by the one or more processors, cause the computing system to perform the splitting, the processing of the first channel portion, the processing of the second channel portion, and the combining are performed for each of the one or more channels of each of the set of tiles of two or more resolutions of the image.

Other aspects and features of the present disclosure will become apparent to those of ordinary skill in the art upon review of the following description of specific implementations of the application in conjunction with the accompanying figures.

Figures 1A, 1B:
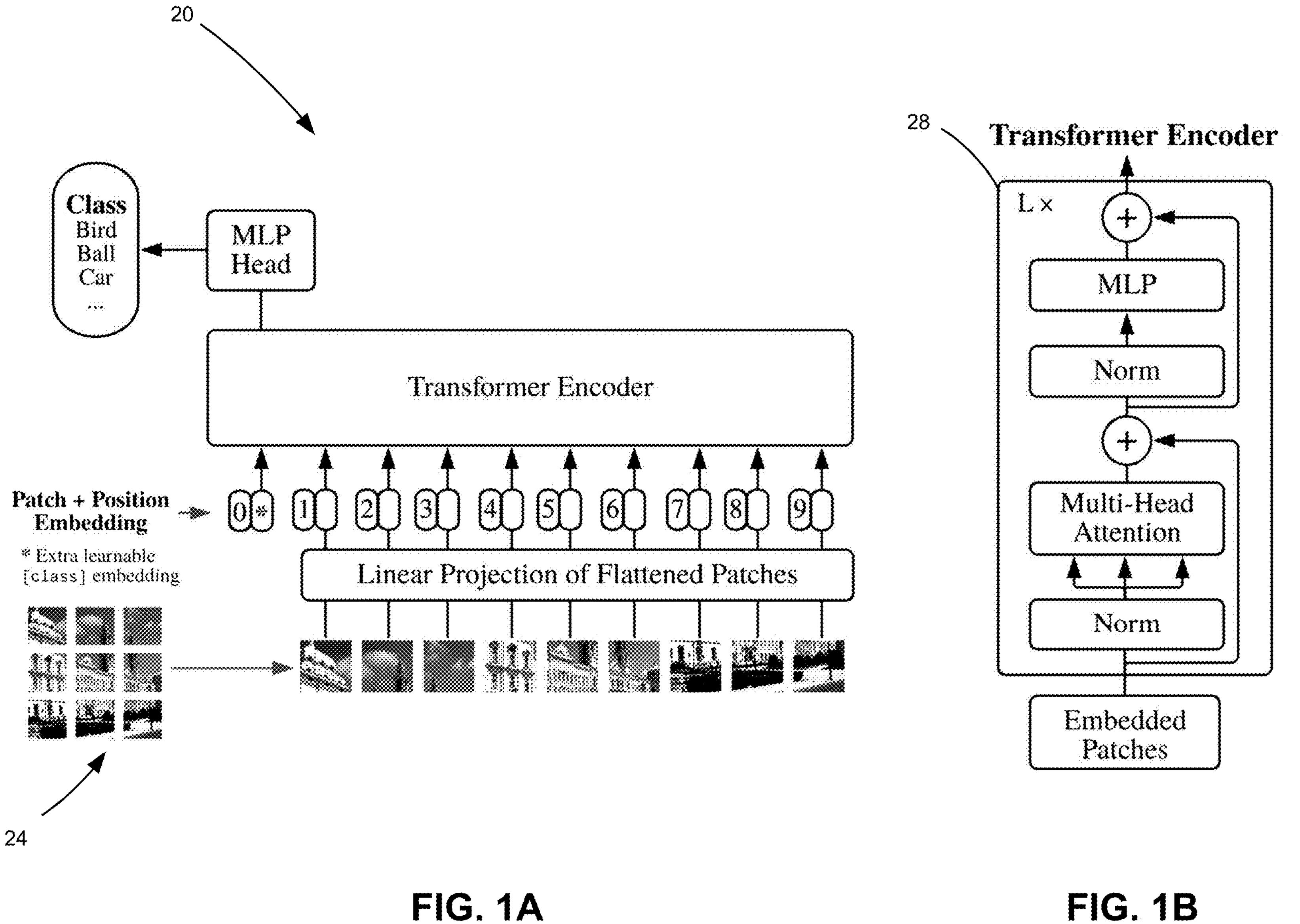
FIGS. 1A and 1B are schematic diagrams of a prior art vision transformer architecture.

Unless otherwise specifically noted, articles depicted in the drawings are not necessarily drawn to scale.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although such functions are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

Current methods dedicating to reducing the computational complexity of vision transformers focus merely on token reduction while the splitting of dimensionality of feature maps can be an orthogonal method to further reduce its complexity without sacrificing model's performance.

Herein is proposed a novel method to accelerate vision transformers from a new angle. Knowledge of the fact that the computational complexity of MHSA is quadratic to a feature's channel dimension is used to build a different architecture that is different than the design of lightweight transformers.

Proposed herein is a novel approach that reduces the computational complexity of the MHSA block with token reduction as well as with channel split. In order to fully utilize the diversity of features experiencing different blocks, a window-shifting channel split method is also introduced. The proposed architecture focuses on reducing complexity of the MHSA from orthogonal axes.

FIG. 1A shows a general vision transformer architecture 20. As shown, a vision transformer 20 splits an image into multiple patches 24 and considers them as a sequence of tokens. FIG. 1B shows the general architecture of a vanilla transformer, which includes a stack of MetaBlocks 28.

Disclosed herein is a novel attention module 104 in vision transformers which reduces computational complexity and improves inference latency. The attention module 104 can do so without degradation of performances.

Figure 2:
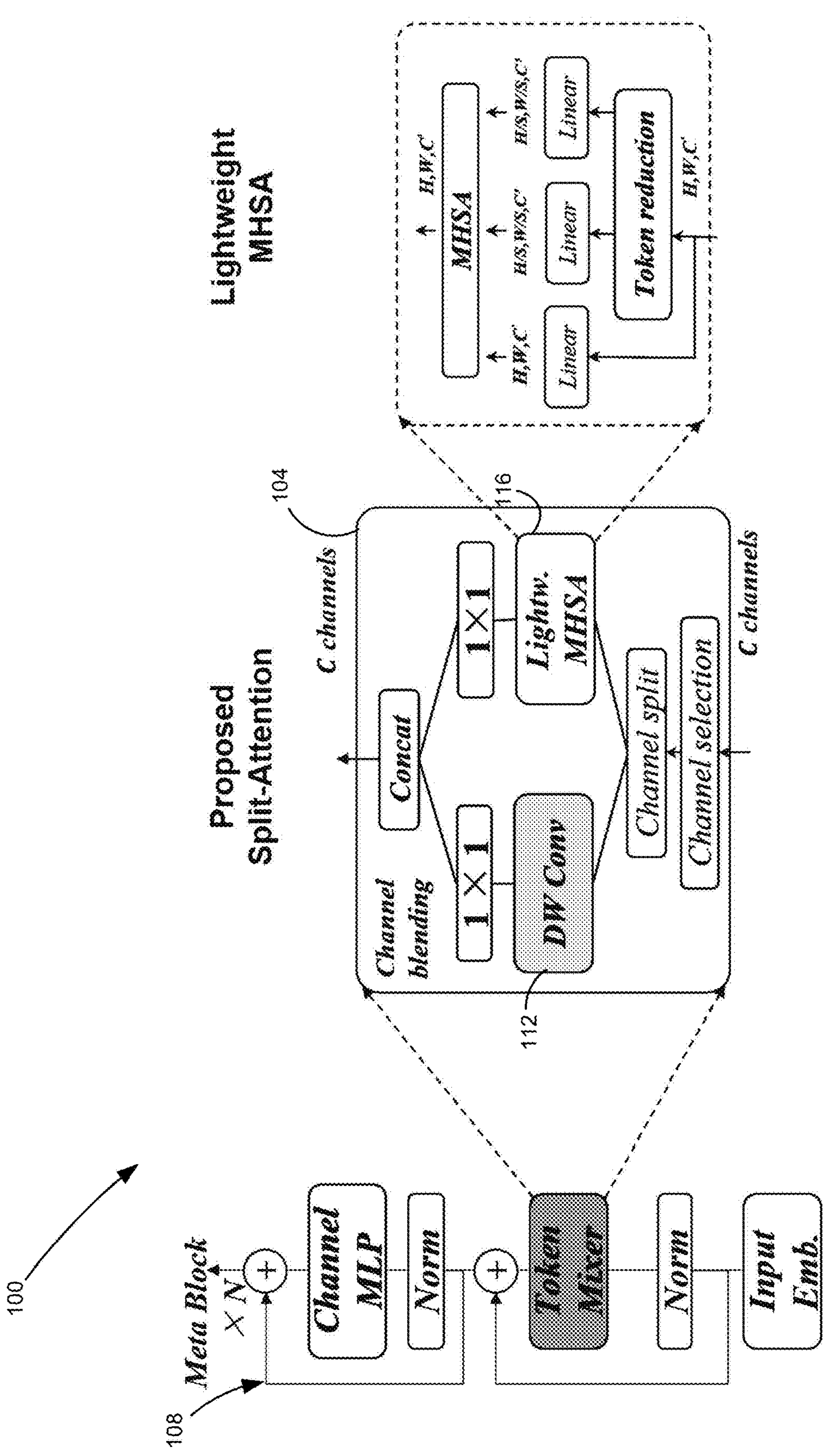
FIG. 2 is a schematic diagram of a MetaBlock architecture for a vision transformer network for using a split-attention block in accordance with exemplary embodiments described herein.

FIG. 2 illustrates a proposed split-attention block 104 in accordance with exemplary embodiments of the disclosure. The split-attention block 104 includes a MetaBlock that is similar to the MetaBlock of a conventional vision transformer, in which computationally-expensive MHSA is usually used as a token mixer. The split-attention block 104 mitigates the computational burden of expensive token mixers without diminishing accuracy. In the split-attention block 104, depthwise convolution (also interchangeably referred to as "DW-Conv" herein) 112 and a token-reduced lightweight attention module 116 is utilized. On the right is shown a token-reduced attention architecture.

The split-attention block 104 splits a channel dimension of input feature maps into N chunks, each of which are then fed into different components, including the (token-reduced) lightweight MHSA 116 and the depthwise convolution (DW-Conv) 112. The resulting N features embed therefore rich yet diverse information. To exploit the diversities of the features, the design disclosed also includes a novel shifting method using shifted window to select channels to different components. In practice, it has been found that N=2 results in a good complexity-performance trade-off. The disclosed split attention design has two main benefits. The split-attention block 104 enables effective local and global information aggregations by feeding simultaneously split features into the lightweight MHSA 116 and the 3×3 DW-Conv 112. The former captures global dependency (image-level semantics) across all tokens, while the latter emphasizes the discovery of fine-grain cues from neighboring local tokens. In addition, the computational complexity of MHSA can be significantly reduced by both reducing the channel dimension and the token size. The improvements afforded by the split-attention block 104 are consistent for different tasks, such as object classification and detection tasks. Thus, this architecture has values in applications where vision transformers have potential to be used.

Figure 6:
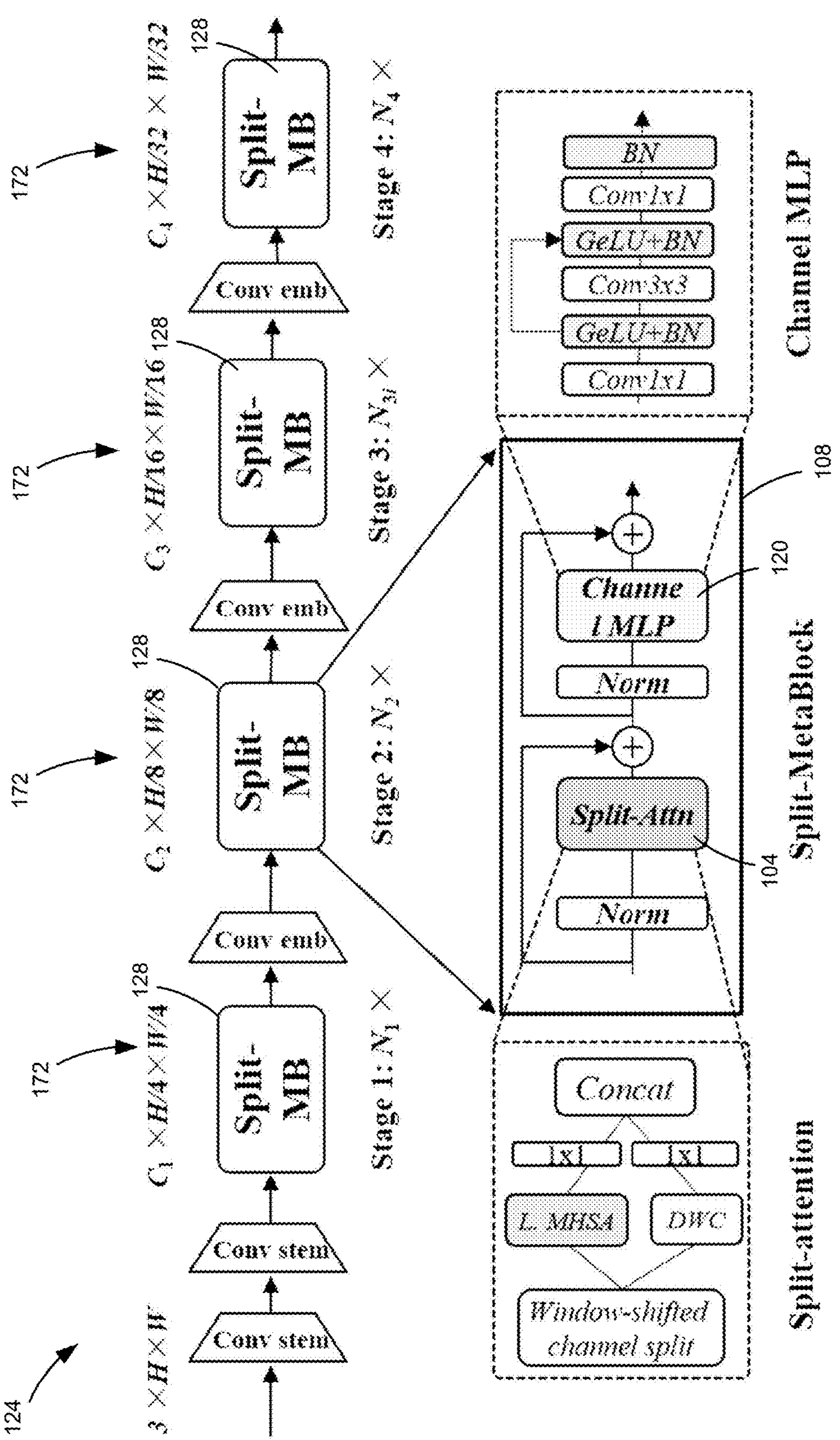
FIG. 6 is a schematic diagram of an architecture for a vision transformer network employing the split-transformer (alternatively referred to herein as split-former) approach of FIG. 5 in accordance with exemplary embodiments described herein.

Based on the split-attention block 104 shown in FIG. 2, a split-former is proposed, the split-former including a novel series of lightweight transformers which balance between performance and computational complexity. The split-former includes multiple MetaBlocks 108, as shown in FIG. 6, with each one including a split-attention block 104 and a channel multilayer perceptron (MLP) block 120. Split attention mixes token information in a cheaper way, while channel MLP is used afterwards to enhance the expressiveness of the features. The whole vision transformer 124, as shown in FIG. 6, adopts a four-stage resolution design, where each stage 172 includes multiple split-MetaBlocks 128. This network can thus enjoy the powerful split-attention block 104 at all scales. Experiments showed the structure's superiority in terms of accuracy and speed.

In one exemplary embodiment, the computational complexity of MHSA is reduced by using token reduction and a channel split mechanism.

Technically, $X \in R^{C \times H \times W}$ is denoted as an input feature, where C, H, and W represent the channel dimension, height and width of the input feature. MHSA firstly projects X into three matrices Q, K, and V of the same shape. An attention matrix is then computed to indicate the pairwise relationship of each token, based on $$Attn = \text{Softmax}\left(\frac{Q \cdot K^T}{\sqrt{C}}\right) \in R^{HW \times HW} \quad (1)$$

The resulting feature map is the linear combination of matrix V and the attention matrix Attn with a complexity of $O(2CH^2W^2+4C^2HW)$, which is quadratic to both token size ($H \times W$) and channel dimension C. This embodiment adopts the channel splitting mechanism to both reduce the complexity burden on ($H \times W$) and C.

Figure 3A:
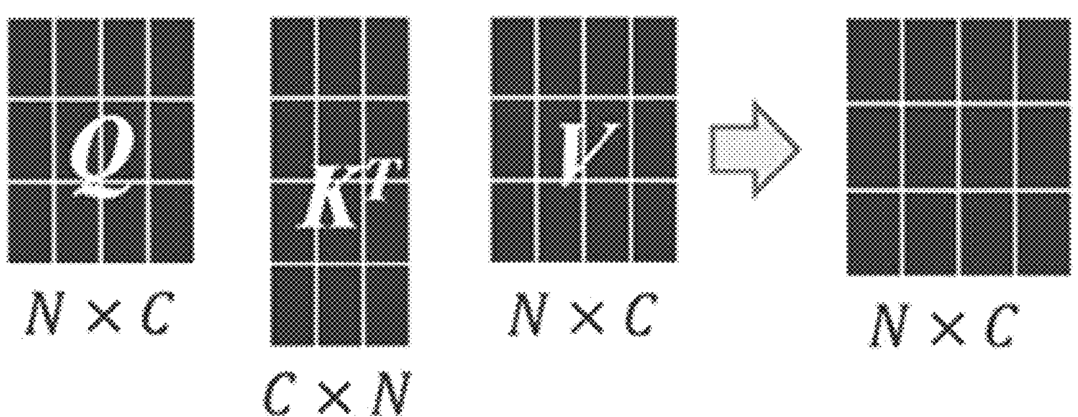
FIG. 3A shows the reduction in token size performed by a prior art MHSA system.
Figure 3B:
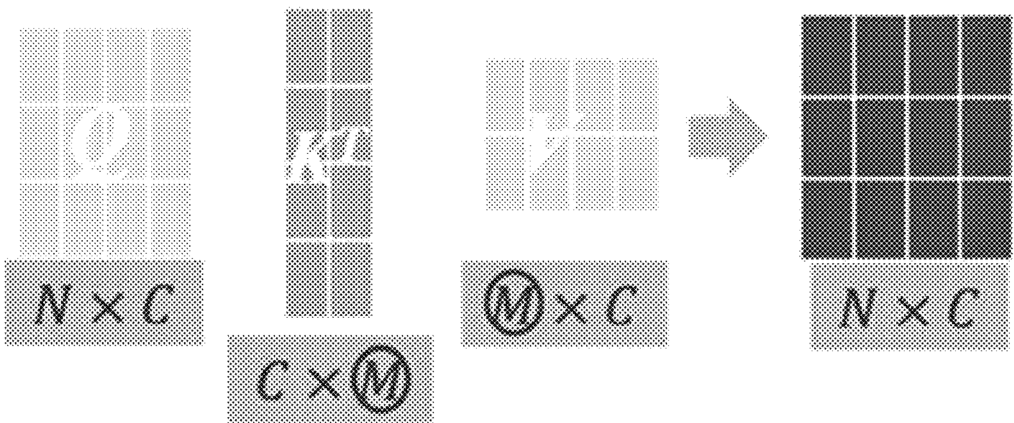
FIG. 3B shows a reduction in token size used in some prior art approaches.

FIG. 3A shows the QKV shape and matrix multiplication for vanilla MHSA, resulting in high computational cost. FIG. 3B shows the QKV shape and matrix multiplication for lightweight MHSA, wherein only the token size is reduced without considering the dimensionality of the features.

Figure 3C:
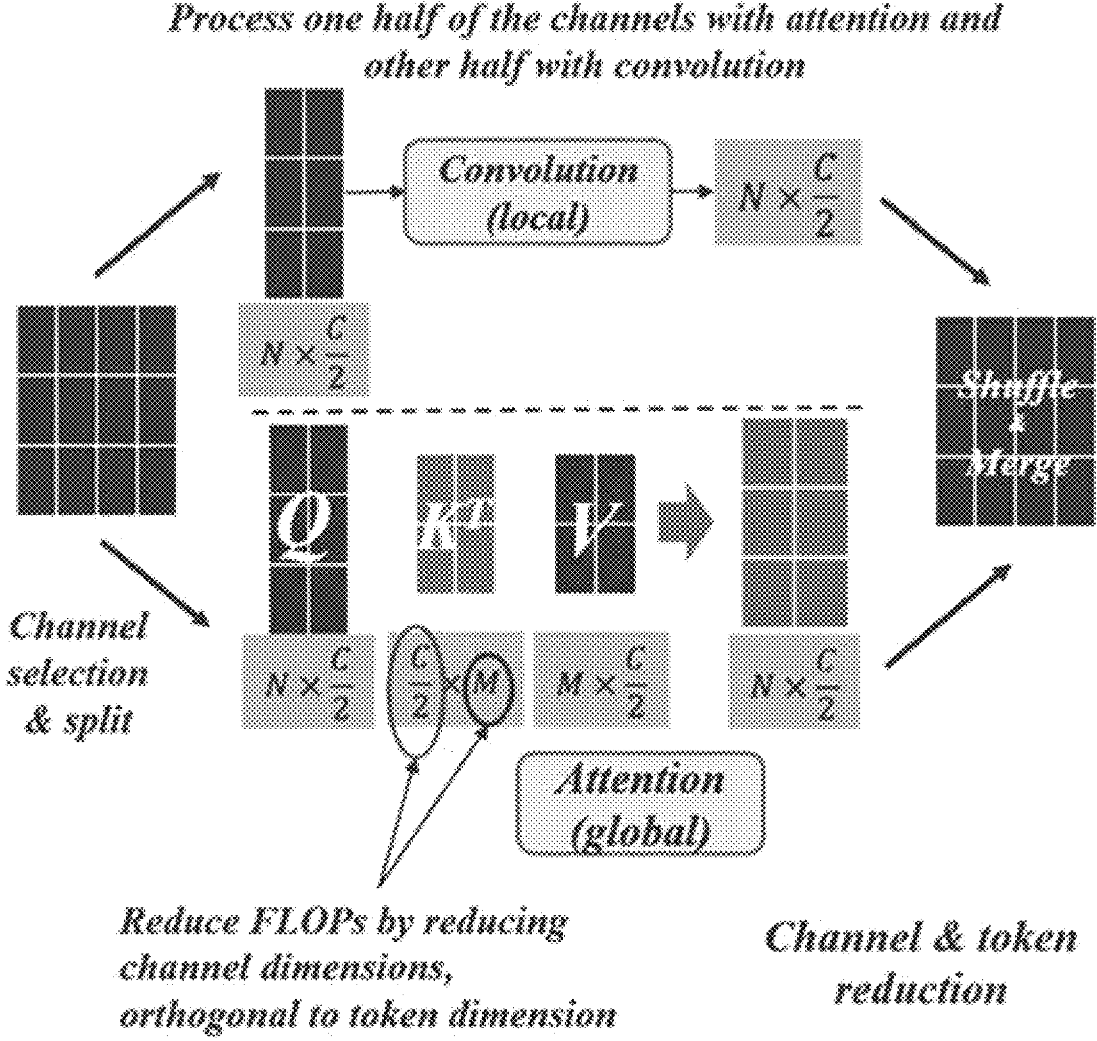
FIG. 3C shows the reduction in both token size and dimension using the architecture of FIG. 2.

FIG. 3C shows the QKV shape and matrix multiplication for the vision transformer 124 including the split-attention block 104, which combines token reduction and dimension reduction with split, shuffle and concatenate (merge) operations. Although any channel split can be adopted, a split of 50:50 of split was used to illustrate the efficient computation of the vision transformer 124. Smaller channel number towards attention can further reduce the complexity.

The architecture in the vision transformer 124 splits X into two chunks, resulting in two tensors with half dimensionality C/2. Although any dimensional split can be used, a 50:50 split is used for the sake of illustration. These two tensors are then fed into a DW-Conv and a lightweight attention module, respectively. DW-Conv has a kernel size of 3×3 and seeks to capture local information from neighborhood pixels, which has a complexity of 9CHW. Lightweight attention takes the other split feature and computes the attention matrix with a token reduction ratio of S, so that K, V has a spatial resolution of H/S and W/S. The token reduction can be achieved by DW convolution with stride, adaptive average pooling, or simply subsampling. The complexity of the lightweight attention is $7/4N \cdot C^2+H^2W^2C/S^2$. The whole computational cost is therefore significantly reduced.

It is also worth noting that the complexity by attributing a smaller number of channels to the attention block can be further reduced, but this may deteriorate the overall performance.

Selecting channels and assigning them to DW Conv and MHSA be important function for the split-attention block 104. The beneficial way to assign channels can spread diverse information from different chunks throughout features, and therefore improve overall performance. Split attention offers an effective way to create features with different characteristics by passing different feature chunks to lightweight MHSA and DW convolution. It is desirable for every channel to have an equal chance of being processed differently. The shifting operation as one possible implementation of channel selection is thus designed for this purpose: it shifts channels by layer and thus allows a simple split to create this equality between channels.

Figure 4:
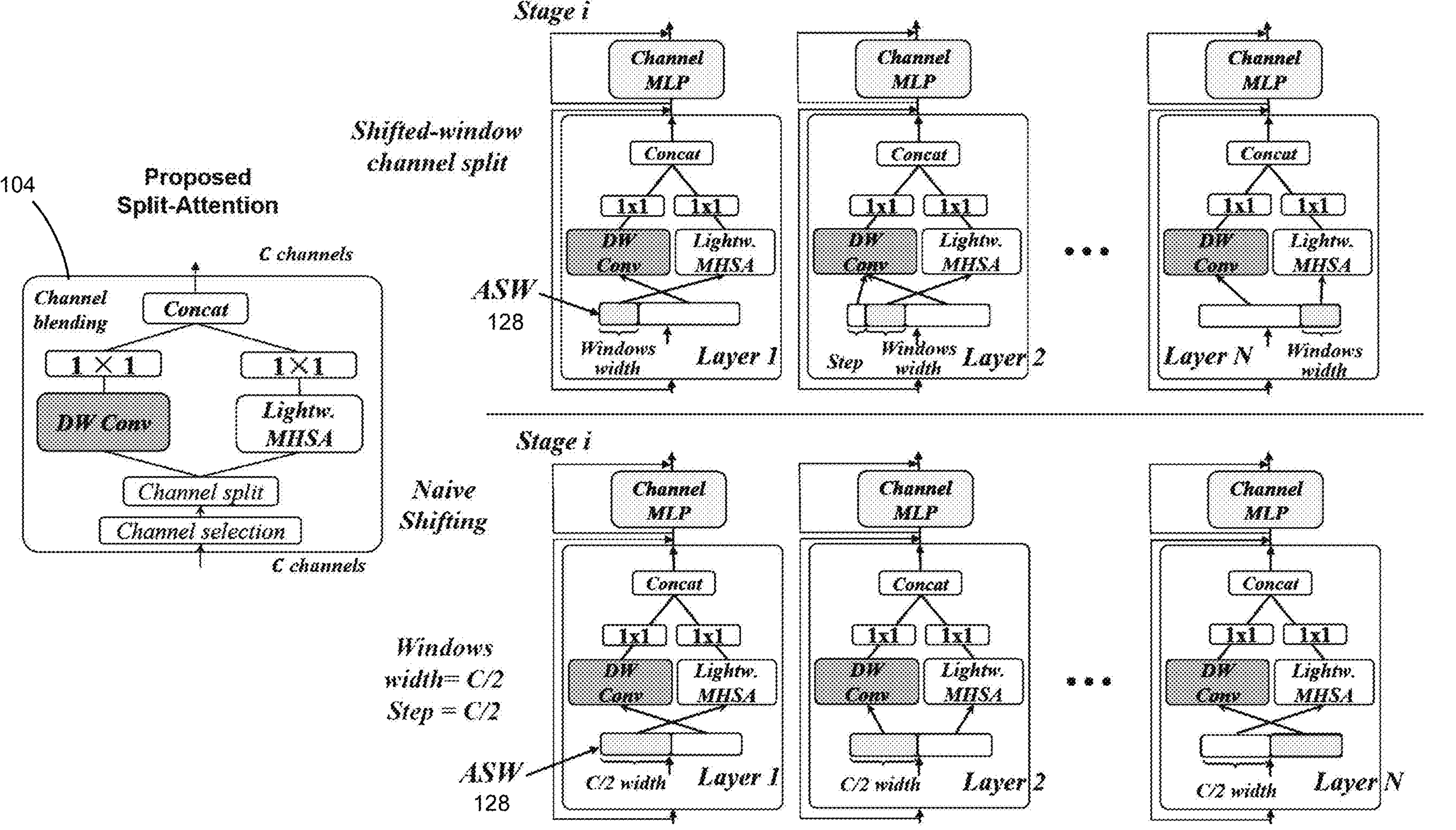
FIG. 4 is a schematic diagram of a shifting architecture that works with the split-attention architecture of FIG. 2.

Although many shifting and split strategies can be adopted, a window-shifting channel-split method is proposed, as illustrated in FIG. 4. This window-shifting channel-split method employs a window targeting different channel locations in different layers to dynamically choose channels for different split-attention components. In this approach, a layer-specific "attention selection window" (ASW) 128 for channel selection and split is introduced. Channels within ASW 128 are assigned to attention computation while channels outside of it are fed into DW-Conv. If ASW 128 is large, the attention selection window can take a large portion, resulting in a dominant computation for attention. If, instead, ASW 128, is small, more channels are fed into DW-Conv, leading to less complexity. Therefore, one can adapt the network according to the accuracy requirement and computational constraints. As a practical implementation of ASW 128, two hyperparameters, window width and shifting step, can be introduced, which jointly determinate the location and the width of the ASW, as shown in the upper portion of FIG. 4. In addition, when these two hyperparameters are equal to C/2, the proposed scheme degrades to naive shifting: one iterates different chunks to different operation per layer.

The proposed shifting mechanism illustrated in FIG. 4 works with the split-attention block 104. In the upper portion is shown the shifted-window channel split, which relies on a moving window to select channels to pass to TokenMixture and DW-Conv. In the lower portion is shown a special case of shifted-window channel split, where one just exchanges the position of each chunk for every layer.

Based on split attention, split-former, a novel vision transformer is disclosed to provide both efficient inference and good performance.

Figure 5:
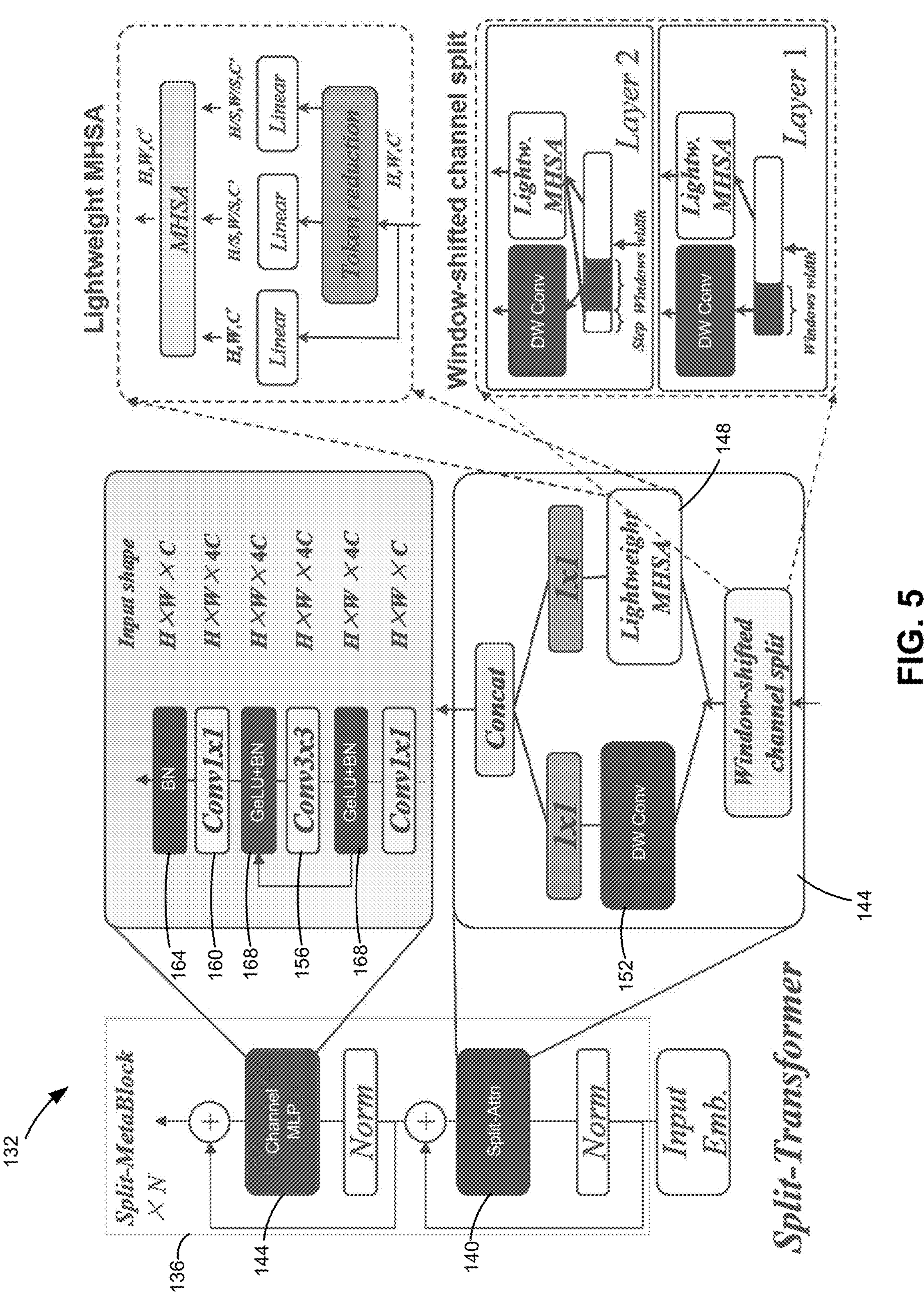
FIG. 5 is a schematic diagram of an architecture for a vision transformer network using a shifting architecture in conjunction with a split-attention block in accordance with some exemplary embodiments.

The split-former 132 consists of multiple split-MetaBlocks 136, as shown in FIG. 5, with each one including a split-attention block 140 and channel-MLP blocks 144. The main structure is similar to a conventional MetaBlock 28 shown in FIG. 1. The split-attention block 144 with lightweight MHSA 148 and DW-Conv 152 is used as a token mixer, while the channel MLP 144 equipped with DW-Conv 3×3 is used. As presented previously, split attention mixes the token information in a cheaper yet efficient way, so that the resulting feature representation can embed both local cues and global information of the input image. In split-MetaBlock 156, the channel MLP 144 is appended after the split-attention block 140, whose main purpose is to expand and compress the representation and add nonlinearity, so as to enhance the expressiveness of the features. Although the choice of channel-MLP 144 can be flexible, DW-Conv 1×1 160 and DW-Conv 3×3 156 with BN 164 and GeLU 168 are used for activation.

The whole network 124, as shown in FIG. 6, adopts a four-stage resolution design, where each stage 172 includes multiple split-MetaBlocks 128 that are applied sequentially. Downsampling is performed at the beginning of each stage 172 except for the first split-MetaBlock 108, which merges nearby pixels via techniques such as convolution with stride=2 or bilinear interpolations. This practice can thus allow the split-former attention block to be performed at different spatial resolution hierarchically. The split-former 132 affords significant flexibility, where the capacity of the network can be adjusted by a) modifying the layers included in these four blocks, b) changing the window width in windows-shifted channel split, and c) resizing the input image spatial resolution.

Tests indicate that the disclosed structure's superiority in terms of accuracy and speed compared with state-of-the-art works in the field of lightweight vision transformers. The labels "L. MHSA" and "DWC" refer to lightweight MHSA and DW-Conv, respectively.

Split attention can be used as a universal plug-and-play module for insertion into vision transformers to reduce the computational complexity and inference time without hurting models' accuracy.

Table 1 shows a parameter value, FLOPs, and latency comparison of MHSA and Lightweight MHSA with and without the disclosed split-attention block, thus demonstrating the latency of the split-attention block with respect to a vanilla MHSA and lightweight MHSA. It can be observed that the split-attention block successfully reduces the parameter amount, floating-point operations (FLOPS), as well as latency for both cases, with large significance. Moreover, the proposed split-attention block with lightweight MHSA has achieved the best improvement in terms of computational complexity.

TABLE 1

| Name | Parameter (M) | Image size | FLOPS(G) | Latency (ms) |
|---|---|---|---|---|
| Vanilla MHSA | 1.05 | (1024, 512) | 2.147 | 1.29 |
| Split MHSA | 0.26 | | 0.808 | 0.62 |
| Vanilla lightweight MHSA | 1.06 | | 0.638 | 0.28 |
| Split Lightweight MHSA | 0.27 | | 0.179 | 0.17 |

The benefits of shifting operation is due to the fact that it is desirable to allow for each channel to pass through both MHSA and DW convolutions so that the model can have higher expressiveness. The proposed window-shifted channel split method is a general splitting method that uses two hyperparameters: windows width and step. As can be seen in FIG. 4, when these two hyper-parameters are equal to C/2, it degenerates to naive shifting. Moreover, window width can be a critical hyper-parameter to further fine-tune the trade-off between accuracy and speed. Finally, the shifting operation does not require any multiplication nor addition and thus is computationally cheap. Models can benefit from the shifting operation with nearly no cost to achieve better performance.

The proposed network and approach presents significant benefits, which enjoys a reduced computational burden and improved performance. The benefits of this approach were analyzed by performing comparison studies against various efficient transformer architectures, including the following:

M. Tan et al., "Efficientnet: Rethinking model scaling for convolutional neural networks", International conference on machine learning, PMLR, 2019, p. 6105-6114

Y. Li et al., "EfficientFormer: Vision Transformers at MobileNet Speed", arXiv:2206.01191, 2022

J. Guo et al., "Cmt: Convolutional neural networks meet vision transformers", Proceedings of the IEEE/CVF Conference on Computer Vision and Pattern Recognition, 2022, p. 12175-12185

W. Yu et al., "Metaformer is actually what you need for vision", Proceedings of the IEEE/CVF Conference on Computer Vision and Pattern Recognition, 2022, p. 10819-10829

Table 2 summaries these results on image classification task using the ImageNet-1k data set.

TABLE 2

| Model name | Image size | Parameter (M) | FLOPS (G) | latency (ms) | Top 1 acc. (%) |
|---|---|---|---|---|---|
| splitformer-I1 | 160 | 12.58 | 0.69 | 25.6 | 78.64 |
| efficientnet-b0 | 224 | 5.29 | 0.40 | 25.1 | 77.1 |
| efficientnet-b1 | 224 | 7.79 | 0.59 | 35.6 | 79.1 |
| CMT-tiny | 160 | 9.49 | 0.66 | 38.8 | 79.1 |
| Poolformer | 224 | 11.92 | 1.82 | 60.09 | 77.2 |
| Efficientformer | 224 | 11.84 | 1.30 | 44.5 | 77.1* |

Table 3 shows a comparison of the results on the CoCo-17 object detection dataset. The pretrained models are used as a backbone of detection models and the average precision (AP) performances were measured.

TABLE 3

| Model name | Parameters (m) | Flops (g) | Latency (ms) | AP |
|---|---|---|---|---|
| splitformer-I1 | 20.76 | 8.71 | 230 | 38.3 |
| Resnet-18 | 21.45 | 9.27 | 242 | 34.0 |
| Poolformer | 21.65 | 9.28 | 267 | 37.3 |
| Efficientformer | 21.45 | 8.74 | 238 | 37.9 |
| efficient-b0 | 13.28 | 7.79 | 225 | 21.5 |

It can be seen from the results in Table 3 that the proposed split-former approach achieved the best trade-off compared with various models. It largely outperformed efficientnet-b0 when a strict 30 ms latency is required, usually imposed by mobile and edge devices. These experimental results reveal the effectiveness of the disclosed split-former approach in mobile and edge devices.

To further confirm the usefulness of the proposed network in various vision tasks, object detection experiments were also carried out using different network as encoder backbone with pretrained weights optimized in the ImageNet-1k data set. As shown in Table 3, the proposed vision transformer achieved the best AP performance and the second-best latency among all tested models. Experimental results suggested the versatile nature of the disclosed architecture.

Figure 7A:
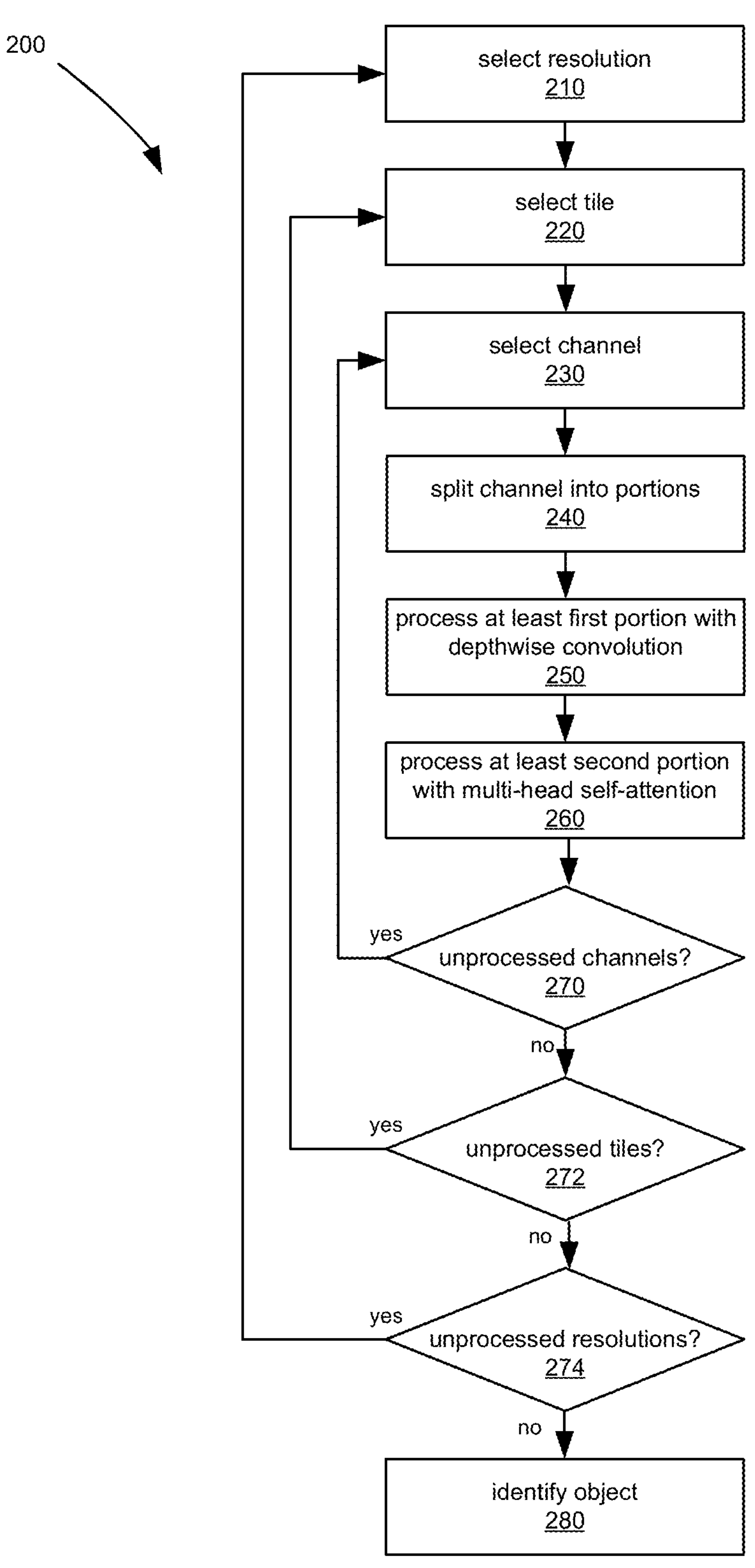
FIGS. 7A and 7B show flow charts of a general method for vision transforming in accordance with some exemplary embodiments described herein.

FIG. 7A shows a general method 200 for vision transforming in accordance with exemplary embodiments of the disclosure. The method 200 commences with the selection of a resolution for an image (210). The image is then divided into tiles, and a tile is selected (220). A channel is then selected for the tile (230). The channel for the tile is split into two or more portions (240). A first portion is processed with depthwise convolution (250), and a second portion is processed with multi-head self-attention (260). If it is determined that there are unprocessed channels for the tile of the image at 270, the method 200 returns to 230, at which an unprocessed channel is selected. Otherwise, the method 200 proceeds to 272, where it is determined if there are unprocessed tiles (272). If there are unprocessed tiles, the method 200 returns to 220, at which an unprocessed tile is selected. If it is determined that there are no unprocessed tiles at 272, then it is determined if there are unprocessed resolutions (274). If it is determined that there are unprocessed resolutions for the image at 274, then the method 200 returns to 210, at which an unprocessed resolution for the image is selected. If, instead, all of the resolutions for the image have been processed, the object is identified (280), after which the method 200 ends.

Figure 7B:
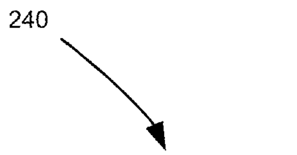
Figure 7B:
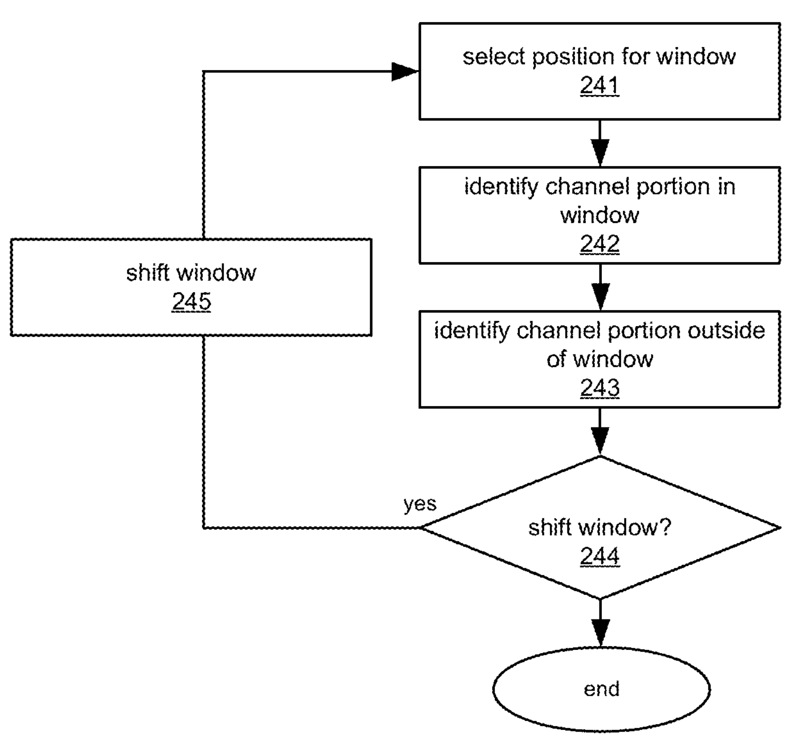

FIG. 7B shows the process 240 for splitting the channel of the tile into two or more portions in greater detail. The method 240 commences with the selection of a position for a window in the channel (241). Next, a first channel portion is identified in the window (242), and a second channel portion outside the window is identified (243). Then, at 244, it is determined if the position of the window is to be shifted. If the position of the window is to be shifted, the window is shifted (245), after which another position for the window is selected (241). In one particular embodiment, the window is shifted by a set offset each iteration. If it is determined at 244 that no further window shifts are required, then the method 240 ends.

The portions of the channel identified in the window are processed with depthwise convolution at 240, and the portions of the channel identified outside of the window are processed with multi-head self-attention at 250. In other embodiments, the processing of these portions of the channel can be inverted.

Figure 8:
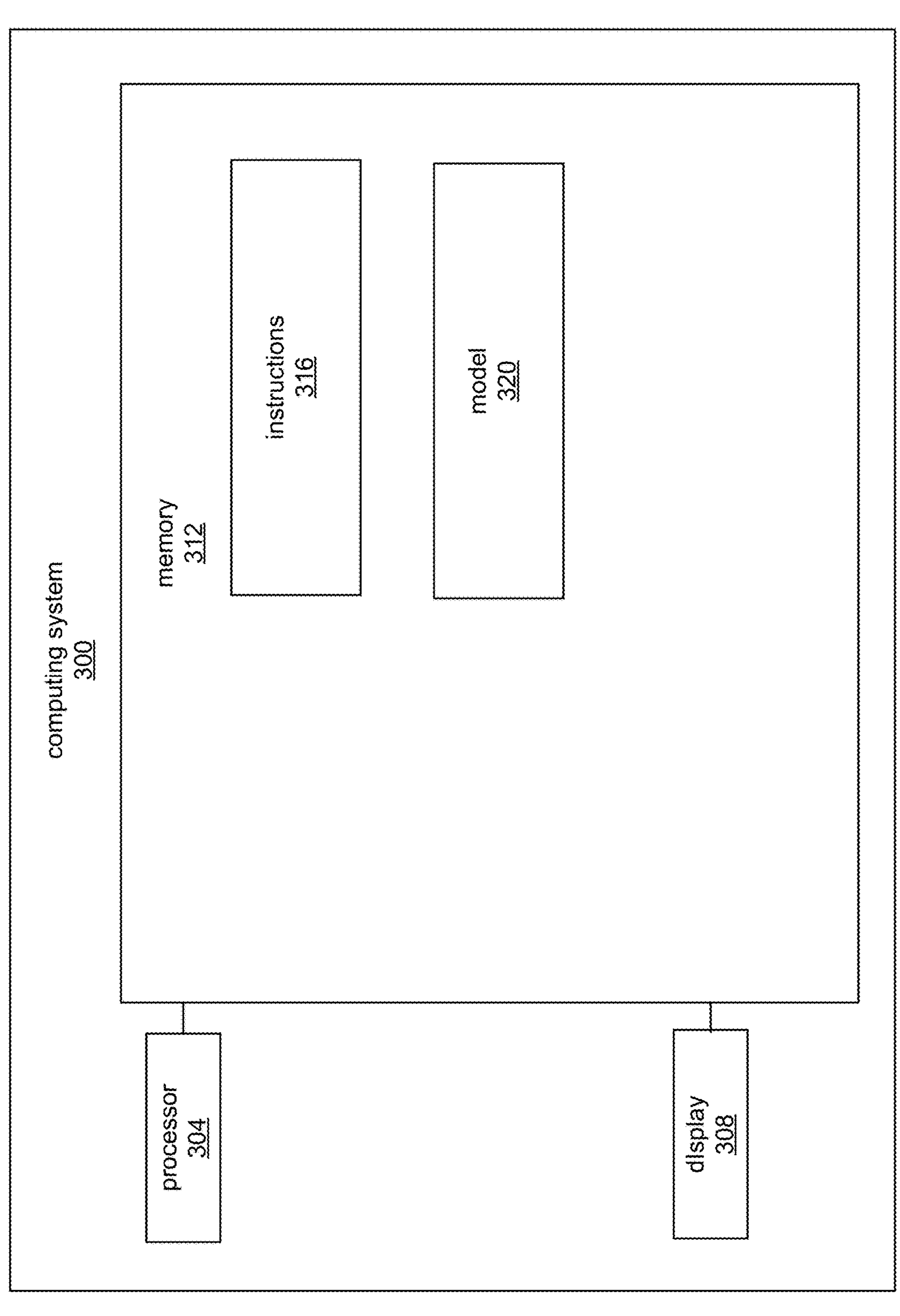
FIG. 8 is a schematic diagram showing various physical and logical elements of a vision transformer system in accordance with exemplary embodiments.

FIG. 8 shows various physical and logical components of an exemplary computing system 300 for vision transforming in accordance with exemplary embodiments of the present disclosure. Although exemplary embodiments of the computing system 300 is shown and discussed below, other embodiments may be used to implement examples disclosed herein, which may include components different from those shown. Although FIG. 8 shows a single instance of each component of the computing system 300, there may be multiple instances of each component shown.

The computing system 300 includes one or more processors 304, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 304 may collectively be referred to as a processor 304. The computing system 300 may include a display 308 for outputting data and/or information in some applications, but may not in some other applications.

The computing system 300 includes one or more memories 312 (collectively referred to as "memory 312"), which may include a volatile or non-volatile memory (e.g., a flash memory, a random access memory (RAM), and/or a read-only memory (ROM)). The non-transitory memory 312 may store machine-executable instructions for execution by the processor 304. A set of machine-executable instructions 316 defining an application process for vision transforming (described herein) is shown stored in the memory 312, which may be executed by the processor 304 to perform the steps of the methods for vision transforming described herein. The memory 312 may include other machine-executable instructions for execution by the processor 304, such as machine-executable instructions for implementing an operating system and other applications or functions.

The memory 312 stores a model 320 for vision transforming as described herein.

In some examples, the computing system 300 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the computing system 300) or may be provided by a transitory or non-transitory computer-executable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 312 to implement data storage, retrieval, and caching functions of the computing system 300.

The components of the computing system 300 may communicate with each other via a bus, for example. In some embodiments, the computing system 300 is a distributed computing system and may include multiple computing devices in communication with each other over a network, as well as optionally one or more additional components. The various operations described herein may be performed by different computing devices of a distributed system in some embodiments. In some embodiments, the computing system 300 is a virtual machine provided by a cloud computing platform.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

In other embodiments, the same approach described herein can be employed for other modalities.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for vision transforming, comprising:

for each of one or more channels of each of a set of tiles of an image:

splitting the channel into at least a first channel portion and a second channel portion;

processing the first channel portion using depthwise convolution, the second channel portion being excluded form processing using depthwise convolution;

processing the second channel portion with multi-head self-attention, the first channel portion being excluded from processing with multi-head self-attention; and combining the processed first channel portion and the processed second channel portion; and identifying an object in the image at least partially based on the combined processed first channel portion and processed second channel portion for each of the one or more channels of each of the set of tiles of the image.

2. The computer-implemented method of claim 1, wherein the processing of the second channel portion includes reducing a size of tokens of the second channel portion.

3. The computer-implemented method of claim 1, wherein the combining includes processing the processed first channel portion and the processed second channel portion with a multilayer perceptron.

4. The computer-implemented method of claim 1, wherein, during the splitting, the first channel portion is positioned within a window at a first position in the channel and the second channel portion is outside of the window at the first position, the method further comprising:

for each of the one or more channels of each of the set of tiles of the image:

shifting the window to a new position; and performing the splitting, the processing using depthwise convolution, and the processing with multi-head self-attention at the new position of the window.

5. The computer-implemented method of claim 4, wherein the window is one-half of the size of the channel.

6. The computer-implemented method of claim 1, wherein the splitting, the processing of the first channel portion, the processing of the second channel portion, and the combining are performed for each of the one or more channels of each of the set of tiles of two or more resolutions of the image.

7. A computing system for vision transforming, comprising:

one or more processors;

memory storing computer-executable instructions that, when executed by the one or more processors, cause the computing system to:

for each of one or more channels of each of a set of tiles of an image:

split the channel into at least a first channel portion and a second channel portion;

process the first channel portion using depthwise convolution, the second channel portion being excluded form processing using depthwise convolution;

process the second channel portion with multi-head self-attention, the first channel portion being excluded from processing with multi-head self-attention; and combine the processed first channel portion and the processed second channel portion; and identify an object in the image at least partially based on the combined processed first channel portion and processed second channel portion for each of the one or more channels of each of the set of tiles of the image.

8. The computing system of claim 7, wherein the computer-executable instructions, when executed by the one or more processors, cause the computing system to, during the processing of the second channel portion, reduce a size of tokens of the second channel portion.

9. The computing system of claim 7, wherein the computer-executable instructions, when executed by the one or more processors, cause the computing system to, during the combining, process the processed first channel portion and the processed second channel portion with a multilayer perceptron.

10. The computing system of claim 7, wherein, during the splitting, the first channel portion is positioned within a window at a first position in the channel and the second channel portion is outside of the window at the first position, and wherein the computer-executable instructions, when executed by the one or more processors, cause the computing system to:

for each of the one or more channels of each of the set of tiles of the image:

shift the window to a new position; and perform the splitting, the processing using depthwise convolution, and the processing with multi-head self-attention at the new position of the window.

11. The computing system of claim 10, wherein the window is one-half of the size of the channel.

12. The computing system of claim 7, wherein the computer-executable instructions, when executed by the one or more processors, cause the computing system to perform the splitting, the processing of the first channel portion, the processing of the second channel portion, and the combining are performed for each of the one or more channels of each of the set of tiles of two or more resolutions of the image.

13. A non-transitory machine-readable medium having tangibly stored thereon executable instructions for execution by one or more processors of a computing system, wherein the executable instructions, in response to execution by the one or more processors, cause the computing system to:

for each of one or more channels of each of a set of tiles of an image:

split the channel into at least a first channel portion and a second channel portion;

process the first channel portion using depthwise convolution, the second channel portion being excluded form processing using depthwise convolution;

process the second channel portion with multi-head self-attention, the first channel portion being excluded from processing with multi-head self-attention; and combine the processed first channel portion and the processed second channel portion; and identify an object in the image at least partially based on the combined processed first channel portion and processed second channel portion for each of the one or more channels of each of the set of tiles of the image.

14. The non-transitory machine-readable medium of claim 13, wherein the computer-executable instructions, when executed by the one or more processors, cause the computing system to, during the processing of the second channel portion, reduce a size of tokens of the second channel portion.

15. The non-transitory machine-readable medium of claim 13, wherein the computer-executable instructions, when executed by the one or more processors, cause the computing system to, during the combining, process the processed first channel portion and the processed second channel portion with a multilayer perceptron.

16. The non-transitory machine-readable medium of claim 13, wherein, during the splitting, the first channel portion is positioned within a window at a first position in the channel and the second channel portion is outside of the window at the first position, and wherein the computer-executable instructions, when executed by the one or more processors, cause the computing system to:

for each of the one or more channels of each of the set of tiles of the image:

shift the window to a new position; and perform the splitting, the processing using depthwise convolution, and the processing with multi-head self-attention at the new position of the window.

17. The non-transitory machine-readable medium of claim 16, wherein the window is one-half of the size of the channel.

18. The computer-implemented method of claim 4, further comprising:

for each of the one or more channels of each of the set of tiles of the image:

shifting the window to a second position within the channel to identify a third channel portion positioned within the window at the second position and a fourth channel portion outside of the window at the second position;

processing the third channel portion using depthwise convolution; and processing the fourth channel portion with multi-head self-attention, wherein the combining includes combining the processed first channel portion, the processed second channel portion, the processed third channel portion, and the processed fourth channel portion.

19. The computing system of claim 10, wherein the computer-executable instructions, when executed by the one or more processors, cause the computing system to:

for each of the one or more channels of each of the set of tiles of the image:

shift the window to a second position within the channel to identify a third channel portion positioned within the window at the second position and a fourth channel portion outside of the window at the second position;

process the third channel portion using depthwise convolution; and process the fourth channel portion with multi-head self-attention, wherein the combining includes combining the processed first channel portion, the processed second channel portion, the processed third channel portion, and the processed fourth channel portion.

20. The computer-implemented method of claim 18, further comprising:

for each of the one or more channels of each of the set of tiles of the image:

shifting the window to a third position within the channel to identify a fifth channel portion positioned within the window at the third position and a sixth channel portion outside of the window at the third position;

processing the third channel portion using depthwise convolution; and processing the fourth channel portion with multi-head self-attention, wherein the combining includes combining the processed first channel portion, the processed second channel portion, the processed third channel portion, the processed fourth channel portion, the processed fifth channel portion, and the processed sixth channel portion.

* * * * *